UNITED STATES PATENT OFFICE.

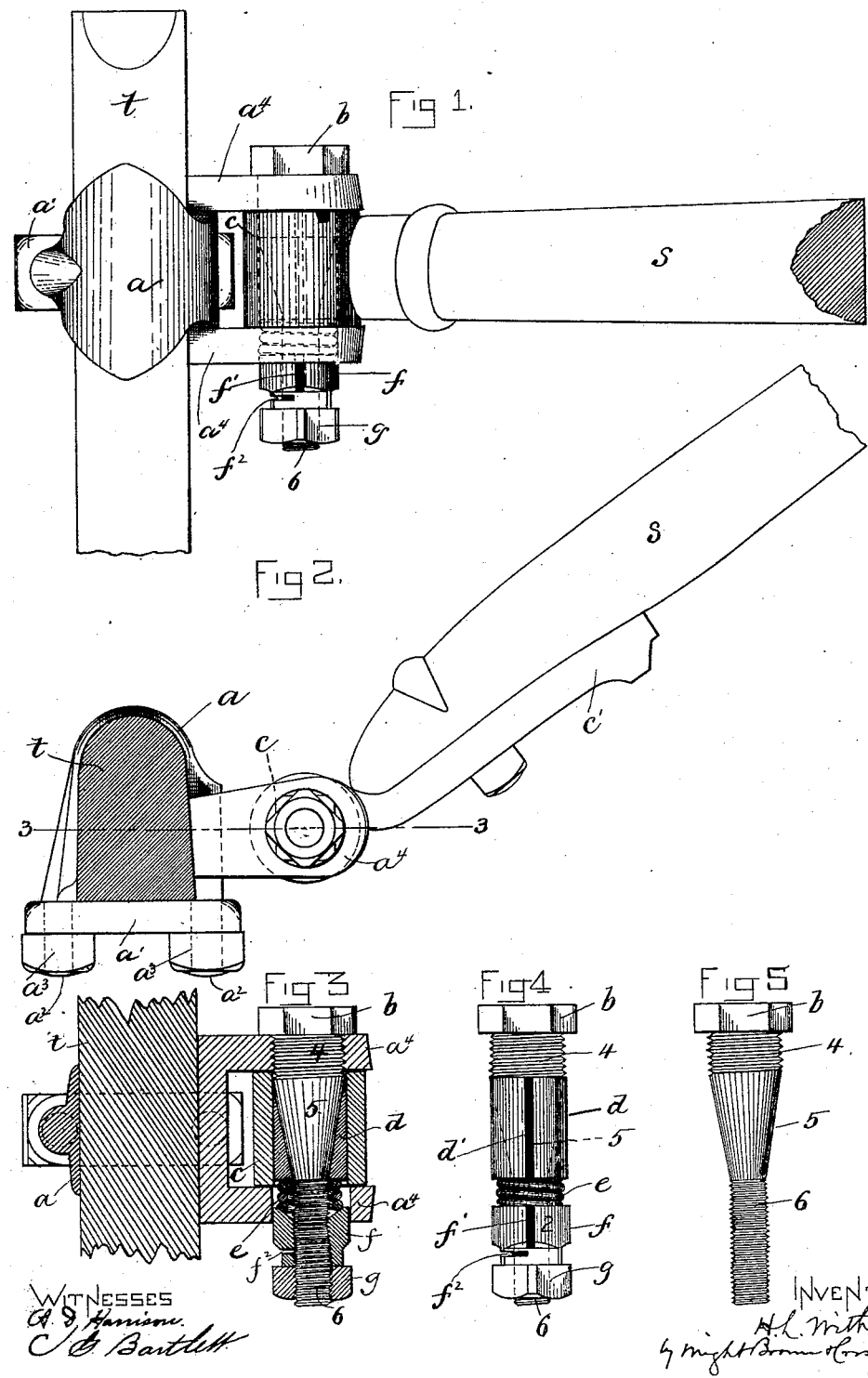

HORACE L. WITHAM, OF PEABODY, MASSACHUSETTS, ASSIGNOR OF ONE-HALF TO ALBERT M. WILKINSON, OF SAME PLACE.

THILL-COUPLING.

SPECIFICATION forming part of Letters Patent No. 454,243, dated June 16, 1891.

Application filed October 23, 1890. Serial No. 369,075. (No model.)

*To all whom it may concern:*

Be it known that I, HORACE L. WITHAM, of Peabody, in the county of Essex and State of Massachusetts, have invented certain new and useful Improvements in Thill-Couplings, of which the following is a specification.

This invention relates to means for preventing the rattling of the members which connect carriage thills or shafts to the axles; and it consists in the improved construction which I will now proceed to describe and claim.

Of the accompanying drawings, forming a part of this specification, Figure 1 represents a top view of a portion of an axle and of one of the shafts connected thereto, together with my improved coupling device. Fig. 2 represents a side elevation, the axle being shown in section. Fig. 3 represents a section on line 3 3, Fig. 2. Fig. 4 represents the connecting device which connects the thill-socket with the ears on the axle-clip, said device being removed from the parts it connects. Fig. 5 represents a view of the stud forming a part of said connecting device removed from the other parts thereof.

The same letters and numerals of reference indicate the same parts in all the figures.

In the drawings, $t$ represents an axle, and $a$ represents a clip of the ordinary form, having short bolts $a^2$ $a^2$ formed on its ends, which bolts pass through the usual cross-bar $a'$ under the axle and are secured thereto by nuts $a^3$ $a^3$.

$a^4$ $a^4$ represent ears formed on the clip $a$ and projecting forward from the axle to receive between them a socket $c$, attached to the thill or shaft $s$.

$b$ represents a stud which is adapted to pass through orifices in the ears $a^4$ $a^4$ and through the socket $c$. Said stud is provided at one end with an enlarged threaded portion 4, adjoining the head of the stud, and with a tapered portion 5, and with a reduced threaded portion 6, as shown in Fig. 5.

$d$ represents a sleeve which is split longitudinally at $d'$, Fig. 4, and is internally tapered to fit the tapered portion 5 of the stud. Said sleeve is placed within the socket $c$, which is bored out to receive the sleeve. After the socket is in place between the ears $a^4$ $a^4$ the stud $b$ is inserted through said ears and socket, its tapered portion 5 snugly fitting the interior of the sleeve $d$.

$f$ represents a nut which is adapted to be screwed upon the reduced threaded portion 6 of the stud. Said nut has a cylindrical portion 2, which is adapted to enter an orifice in one of the ears $a^4$.

$e$ represents a stout spiral spring which is interposed between the nut $f$ and the sleeve $d$.

It will be seen that when the nut $f$ is turned upon the stud toward the sleeve $d$ it will compress the spring $e$ and cause said spring to exert a yielding endwise pressure upon the sleeve toward the larger end of the tapered portion 5 of the stud, thus causing the sleeve not only to fit snugly upon the said tapered portion, but also to expand and fit snugly within the socket $c$. The portion 2 of the nut $f$ is rendered expansible by means of slits $f'$ $f^2$ cut in said nut, so that the compression of the spring $e$ by the adjustment of the nut, as last described, not only expands the sleeve $d$, but also expands the portion 2 of the nut within the orifice of one of the ears into which said nut projects, as shown in Figs. 1 and 3, the nut being thus caused to snugly fit the orifice in the ear.

It will be seen that by the described construction there can be no lost motion or rattling of any of the parts of the coupling that move upon the other parts thereof, all the joints or rubbing surfaces being kept closely pressed together. It will also be seen that the compressed spring $e$, by its continued effort to expand, will keep the sleeve $d$ constantly pressed toward the larger end of the tapered portion 5, so that any wear of the tapered portion 5 or of the interior of the sleeve will be compensated for, so that there can be no looseness caused by wear of said parts.

$g$ represents a lock-nut which is screwed upon the reduced threaded portion 6 of the stud, and when turned up against the nut $f$ secures the same in place against accidental rotation.

The stud $b$, with the devices thereon, as shown in Fig. 4, may be sold as an article of manufacture to be applied to axle-clips and thill-sockets already in use, provided the ears on said clips have orifices sufficiently large to receive the threaded portion 4 and the nut $f$.

I do not limit myself in all cases to the use of the threaded portion 4, the object of said threaded portion being to secure the stud rigidly to the ears $a^4 a^4$, so that it cannot be turned therein. This connection is preferable for various reasons, but not absolutely essential.

It will be seen that the split sleeve $d$ may be expanded without the use of the spring $e$, said sleeve being extended so as to bear upon the nut $f$. Hence I do not limit myself to the spring $e$, although I prefer to employ the same on account of its automatic action in taking up wear of the sleeve and stud, as above described.

I claim—

1. In a thill-coupling, the combination, with the clip having ears, one of which has a screw-threaded orifice, of the socket attached to the thill, the split internally-tapered sleeve in said socket, the tapered stud screw-threaded at one end to engage the said threaded orifice and formed to fit the tapered interior of the sleeve, one of the ears having an enlarged orifice through which the reduced end of the stud passes, and a nut on said reduced end adapted to enter said enlarged orifice and apply endwise pressure to the sleeve within the socket, and thereby expand said sleeve upon the tapered portion of the stud, as set forth.

2. The combination of the clip having ears, the thill-socket adapted to be inserted between said ears, the split internally-tapered sleeve in said socket, the tapered stud formed to pass through said ears and sleeve, a nut engaged with said stud, and a spring interposed between said nut and sleeve and adapted to press the latter continuously toward the larger end of the tapered portion of the stud, and thereby automatically expand said sleeve in compensation for wear, as set forth.

3. The combination, with the clip and its ears, of the stud having an enlarged screw-threaded portion 4, adapted to engage a threaded socket in one of the ears, the tapered portion 5 and the reduced threaded portion 6, the internally-tapered split sleeve formed to fit said tapered portion 5, the nut $f$, engaged with the reduced portion 6 and having the expansible portion 2, adapted to enter an orifice in the other ear, and the spring $e$, interposed between said nut and the sleeve $d$, said spring being adapted to be compressed by the nut, and thereby exert pressure both upon the nut and sleeve, whereby the nut is expanded in the ear that receives it and the sleeve is expanded in the socket on the thill, as set forth.

4. The stud $b$, having the larger threaded portion 4, the tapered portion 5, and the reduced threaded portion 6, combined with the split internally-tapered sleeve $d$, the expansible nut $f$, and the spring $e$, interposed between said nut and sleeve, the whole constituting a device for connecting a thill to the ears on an axle-clip, as set forth.

5. The stud $b$, having the larger threaded portion 4, the tapered portion 5, and the reduced threaded portion 6, combined with the split internally-tapered sleeve $d$, the expansible nut $f$, the spring $e$, interposed between said nut and sleeve, and the lock-nut $g$, adapted to secure the nut $f$, as set forth.

In testimony whereof I have signed my name to this specification, in the presence of two subscribing witnesses, this 14th day of October, A. D. 1890.

HORACE L. WITHAM.

Witnesses:
C. F. BROWN,
A. D. HARRISON.